USOO7346358B2

(12) United States Patent
Wood et al.

(10) Patent No.: US 7,346,358 B2
(45) Date of Patent: Mar. 18, 2008

(54) LOGICAL BOUNDARIES IN COMMUNICATIONS NETWORKS

(75) Inventors: Stephen R. Wood, Beaverton, OR (US); Christopher B. Rogers, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 10/179,941

(22) Filed: Jun. 24, 2002

(65) Prior Publication Data

US 2004/0203862 A1    Oct. 14, 2004

(51) Int. Cl.
*H04Q 7/20* (2006.01)

(52) U.S. Cl. ................... 455/456.1; 455/403; 370/328

(58) Field of Classification Search ............... 455/456, 455/403, 411, 414, 456.1; 713/201, 168; 342/465; 370/328; 707/6
See application file for complete search history.

(56) References Cited

U.S. PATENT DOCUMENTS

| 5,461,390 | A | 10/1995 | Hoshen ..................... 342/419 |
|---|---|---|---|
| 6,031,862 | A | 2/2000 | Fullerton et al. ........... 375/200 |
| 6,154,172 | A | 11/2000 | Piccionelli et al. ...... 342/357.1 |
| 2001/0030607 | A1 | 10/2001 | Osborne et al. ......... 340/573.4 |
| 2002/0059230 | A1* | 5/2002 | Hunepohl et al. ............. 707/6 |
| 2002/0098852 | A1* | 7/2002 | Goren et al. ................ 455/456 |
| 2003/0036374 | A1* | 2/2003 | English et al. .............. 455/403 |
| 2003/0043073 | A1* | 3/2003 | Gray et al. .................. 342/465 |
| 2003/0142641 | A1* | 7/2003 | Sumner et al. ............. 370/328 |
| 2003/0216143 | A1* | 11/2003 | Roese et al. ............. 455/456.1 |
| 2004/0019786 | A1* | 1/2004 | Zorn et al. .................. 713/168 |
| 2004/0078598 | A1* | 4/2004 | Barber et al. ............... 713/201 |

FOREIGN PATENT DOCUMENTS

| EP | 0933961 | 8/1999 |
|---|---|---|
| EP | 0933961 A2 | 8/1999 |
| WO | WO-99/55102 | 10/1999 |
| WO | WO-9955102 A1 | 10/1999 |

OTHER PUBLICATIONS

Denning, D. E., et al., "Location-Based Authentication: Grounding Cyberspace for Better Security", *Computer Fraud and Security*, Oxford, (Feb. 1996), 12-16.
EP Office Action for EP 03761092.0 issued on May 27, 2005.
U.S. Appl. No. 60/380,153, filed on May 4, 2005.
Response to the Official Communication in corresponding European Patent Application No. 03761092.0, (Mar. 23, 2006), 20 pgs.
Substantive Examination Adverse Report in corresponding Malaysian Patent Application No. PI 20032326 (Jun. 6, 2007), 3 pgs.

(Continued)

*Primary Examiner*—Joseph Feild
*Assistant Examiner*—Phuoc Doan
(74) *Attorney, Agent, or Firm*—Schwegman, Lundberg & Woessner, P.A.

(57) ABSTRACT

A network may determine the location of network nodes and tracked assets and make location-based decisions.

21 Claims, 6 Drawing Sheets

OTHER PUBLICATIONS

"Communication Pursuant to Article 96(2) EPC for corresponding European Patent Application No. 03761092.0", (May 27, 2005),9 pgs.

"International Preliminary Examination Report for corresponding PCT Application No. PCT/US03/19095", (Sep. 28, 2005),6 pgs.

"International Search Report for corresponding PCT Application No. PCT/US03/19095", (Oct. 30, 2003),7 pgs.

"Written Opinion for corresponding PCT Application No. PCT/US03/19095", (Apr. 29, 2005),6 pgs.

* cited by examiner

LOGICAL BOUNDARIES IN COMMUNICATIONS NETWORKS

BACKGROUND

Wireless networks allow computers to connect to the network without being tethered by wires. This allows users to freely move about without being disconnected from the network. In addition to the freedoms afforded users, wireless networks are more vulnerable to intruders. This is because intruders (commonly referred to as "hackers"), don't need to be physically located next to a wall plug or network jack to attempt to break into a wireless network.

For the reasons stated above, and for other reasons stated below which will become apparent to those skilled in the art upon reading and understanding the present specification, there is a need in the art for alternate methods and apparatus for wireless networks.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
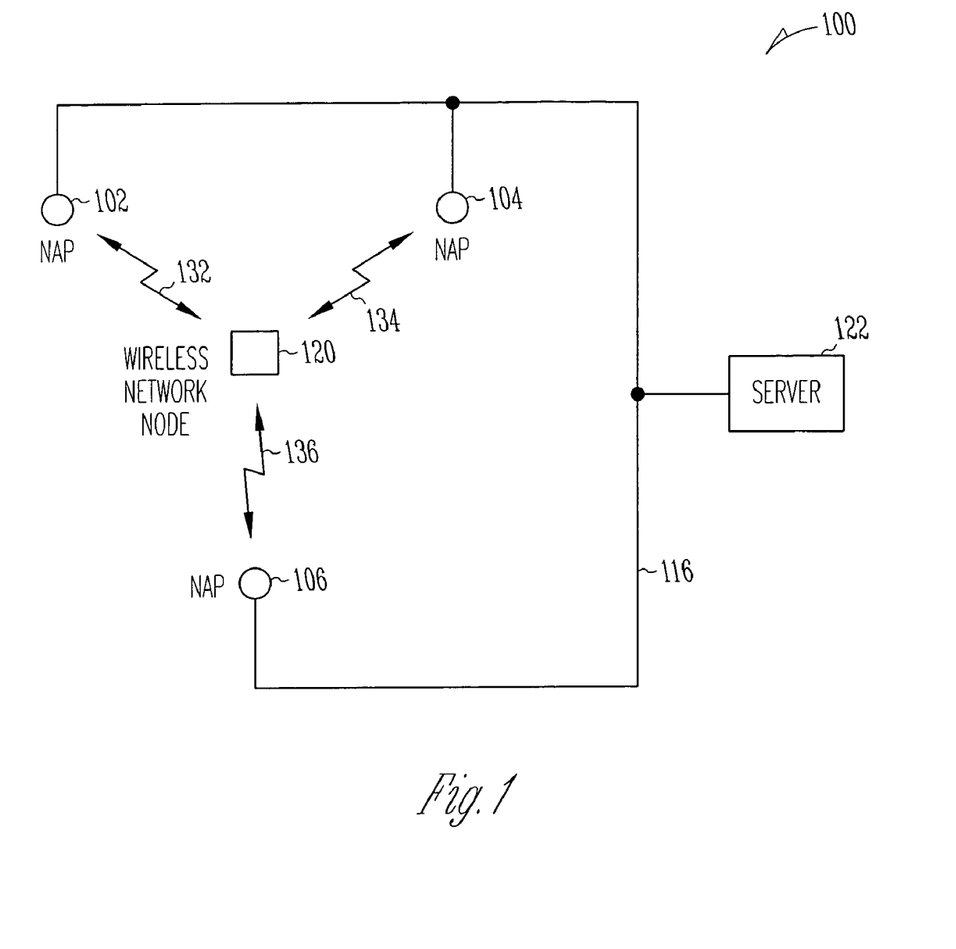
FIG. 1 shows a diagram of a wireless network.

FIG. 1 shows a diagram of a wireless network. Network 100 includes server 122, network access points (NAPs) 102, 104, and 106, and wireless network node 120. Access points 102, 104, and 106 are coupled to server 122 by media 116, and one or more of access points 102, 104, and 106 are coupled to node 120 by wireless links 132, 134, and 136. The combination of access points 102, 104, and 106, and server 122 provide network services to network node 120. In addition, node 120 may, in some embodiments, provide network services to other nodes (not shown), or to any of access points 102, 104, and 106.

Wireless network 100 may be any type of network that allows a node to access network services using a wireless link. For example, in some embodiments of the present invention, wireless network 100 represents a cellular telephone network, and in other embodiments, wireless network 100 represents a wireless local area network (WLAN) or wireless wide area network (WWAN). In still further embodiments, network 100 is a hybrid system that provides a combination of different services to network nodes and access points. Media 116 may be any type of signal transmission media capable of providing a data communication path between server 122 and access points 102, 104, and 106. Examples include, but are not limited to: wires, fiber optic cables, and wireless links.

Wireless network node 120 may be any type of network node capable of accessing network services using a wireless link. For example, node 120 may be a cellular telephone, a computer, a personal digital assistant (PDA), or any other type of device that may access a network using a wireless link. In some embodiments, node 120 may be a combination cellular phone and computer that provides both wireless data and voice services. In other embodiments, node 120 may be an asset tag that is attached to, or otherwise associated with, an asset that is tracked by network 100.

In general, nodes and access points are network elements that may provide network services, receive network services, or both. For example, in cellular network embodiments, access points 102, 104, and 106 may be cellular base stations that provide network services and node 120 may be a cellular telephone that primarily receives network services. Also for example, in wireless LAN embodiments, access points 102, 104, and 106, and node 120 may be computers that provide and receive network services. The remainder of this description describes many different embodiments of the present invention, with an emphasis on wireless LAN embodiments. The emphasis on wireless LAN embodiments is provided for clarity, and one of ordinary skill in the art will understand that embodiments of the present invention are not limited to wireless LANs.

In operation, network 100 provides the ability to determine the location of wireless network nodes. Throughout this description, this ability is referred to as "location determination." Networks that provide location determination are referred to herein as "location-aware" networks. Network 100 is a location-aware network that provides location determination of node 120 through the use of wireless links 132, 134, and 136.

Wireless links 132, 134, and 136 provide communication paths between node 120 and access points 102, 104, and 106. The various access points send and receive wireless signals to and from node 120 on the wireless links, and also send and receive signals to and from server 122 using media 116. In some embodiments, wireless links 132, 134, and 136 utilize a pulse-based radio frequency (RF) protocol to provide communications between node 120 and access points 102, 104, and 106. In these embodiments, short RF pulses are transmitted by node 120 and received by access points 102, 104, and 106. In other embodiments, the wireless links utilize baseband modulated protocols in which the desired data to be transmitted is superimposed by various means on a sinusoidal carrier signal. One example of a suitable pulse-based protocol is the emerging ultra-wideband (UWB) protocol in which low power, short duration, pulses are transmitted over the wireless link. Another example of a suitable pulse-based protocol is described in U.S. Pat. No. 6,031,862, issued to Fullerton et al. on Feb. 29, 2000. In other embodiments, wireless links 132, 134, and 136 utilize a data modulated sinusoidal carrier. Any type of wireless protocol may be utilized for wireless links 132, 134, and 136.

Any type of information may be contained within the signals received from node 120. For example, the signals may contain voice information or data information, in any analog or digital format suitable for requesting or providing network services.

When receiving wireless signals from node 120, the various access points may also gather information describing attributes of the wireless signals. For example, in pulse-based embodiments, the access points may gather pulse time-of-arrival information as well as angle-of-arrival, pulse amplitude, pulse duration, and rise/fall time information. In sinusoidal carrier embodiments, the access points may gather center frequency, angle-of-arrival, amplitude, phase offset, or other information. In general, information gathered describing attributes of the received signals may include any type of information, including information suitable to support location determination. For example, pulse time-of-arrival information, angle-of-arrival information, or both, may be used to determine the location of network node 120 relative to the locations of the access points. Also for example, phase offset of a received sinusoidal carrier signal may also be used in support of location determination.

Attributes of received wireless signals may be transmitted from the various access points to server 122. These attributes may then be used by server 122 to determine the location of node 120. For example, in pulse-based embodiments, pulse time-of-arrival and optionally pulse angle-of-arrival information gathered by the access points may be used to resolve the position of node 120 relative to the locations of the access points that measure the time-of-arrival and optionally angle-of-arrival. Also for example, in sinusoidal carrier embodiments, phase offsets may be used to resolve the location of node 120.

FIG. 1 shows three access points. In embodiments with three access points capable of receiving signals from node 120, the location of node 120 may be determined in two dimensions. Some embodiments have more than three access points. In embodiments with four or more access points capable of receiving signals from node 120, the location of node 120 may be determined in three dimensions.

Figure 2:
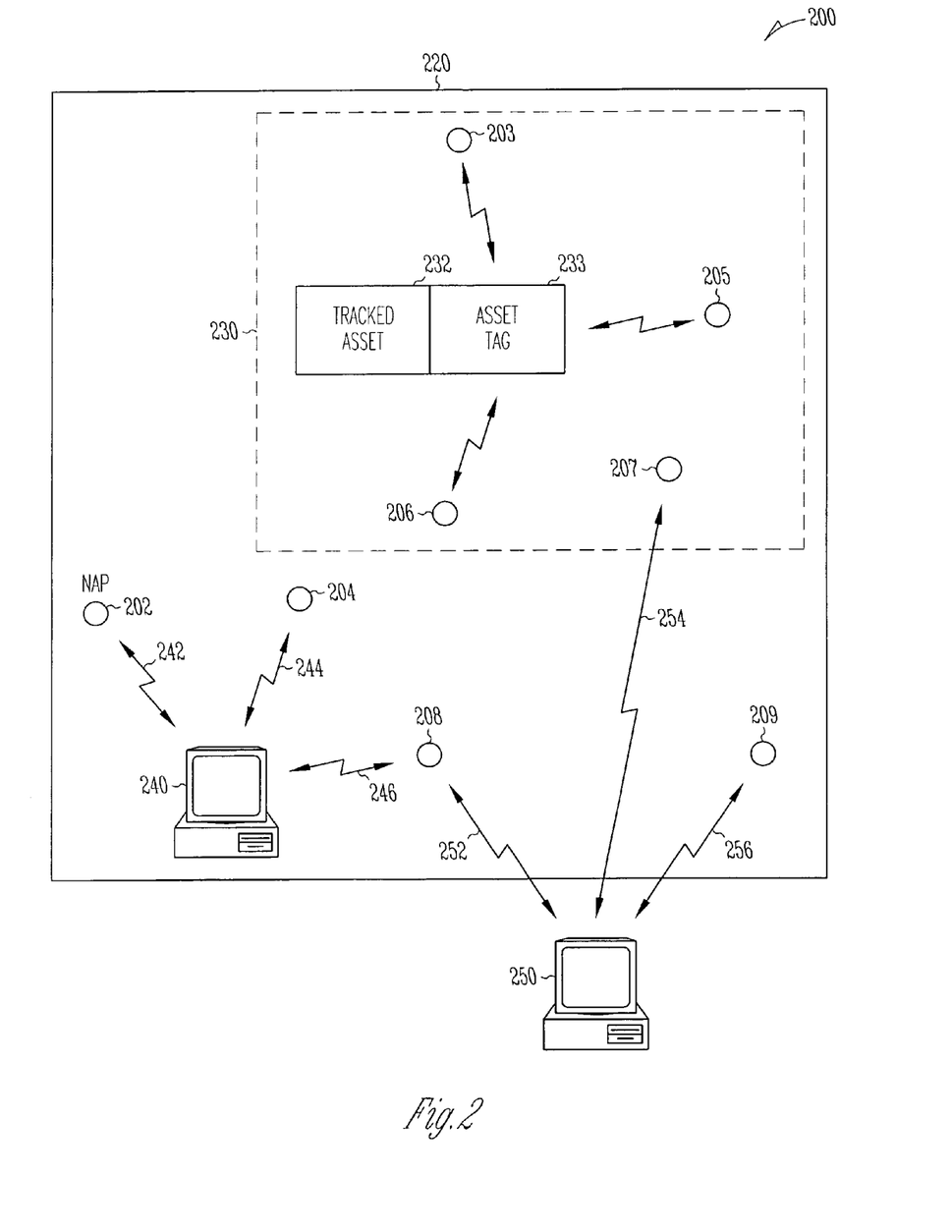
FIG. 2 shows a diagram of a wireless network with logical boundaries.

FIG. 2 shows a diagram of a wireless network with logical boundaries. Wireless network 200 includes network access points (NAPs) 202, 203, 204, 205, 206, 207, 208, and 209, sometimes referred to herein as NAPs 202-209. NAPs 202-209 are coupled to a server (not shown) such as server 122 (FIG. 1). Node 240 is a network node that connects to the network by communicating with one or more of NAPs 202-209. This connection is established when the network node "associates" with a given access point through which it intends to pass data to the rest of the network. During the process of associating to an access point, network nodes typically perform an "authentication" action prior to association. The purpose of authentication is to establish the identity of nodes wishing to connect to the network. An authenticated node is a node that is allowed to connect to the network and receive network services.

Network node 240 communicates with network access points using wireless signals. For example, network node 240 communicates with network access points 202, 204, and 208 using wireless signals on wireless links 242, 244, and 246, respectively. In some embodiments, network node 240 communicates with the network using only one of the wireless links shown, but multiple network access points receive the signals transmitted by network node 240. The location of node 240 is determined by wireless network 200 as described above with reference to FIG. 1.

Also shown in FIG. 2 is logical network boundary 220. When node 240 is inside logical boundary 220, network 200 acknowledges location-based authentication of node 240, and allows node 240 to access the network using the network access points provided that the network does not require further levels of authentication. When node 240 is outside logical boundary 220, network 200 refuses location-based authentication, and does not allow node 240 to access the network. Logical boundary 220 may correspond to the outline of a building, but this is not necessary. For example, logical boundary 220 may correspond to an area within a single building, an area encompassing multiple buildings, or an area outside of any buildings. FIG. 2 shows a single logical network boundary, but this is not a limitation. For example, in some embodiments, multiple logical network boundaries exist. They may overlap such that there is an intersecting area, or they may not overlap such that there are multiple discrete areas from which a network node may connect to the network.

When network node 240 attempts to connect to network 200, network node 240 sends a location-based network authentication request to one of network access points 202, 204, and 208. The network access points receiving the authentication request forward the request to a server. Network 200 determines the location of network node 240, and authenticates the node based on its location relative to logical boundary 220. In the case of network node 240, network 200 determines that the node is within logical boundary 220, and the location-based authentication request is granted.

Also shown in FIG. 2 is network node 250. Network node 250 is outside logical boundary 220. When connecting to the network, network node 250 sends a location-based network authentication request to network access point 208 using a wireless signal on wireless link 252. The wireless signal is also received by network access points 207 and 209 on wireless links 254 and 246, respectively. The network determines the location of network node 250, and determines that network node 250 is outside logical boundary 220. Based on the location of network node 250, the location-based authentication request is denied and network node 250 is not granted access to network 200.

Location-based authentication is an example of a "link-layer" network authentication scheme. Some embodiments possess additional link-layer authentication schemes, such as "open system" and "shared key" authentication. Open system authentication is a null scheme that authenticates all traffic at the link-layer. Shared key authentication is another example of a link-layer authentication scheme wherein an authorized node shares a common secret key code with the network.

Some embodiments of the network utilize other authentication schemes beyond link-layer authentication. Examples of other authentication schemes include operating system (OS) level authentication as provided by network operating systems that maintain individual user level and/or system resource level passwords.

Also shown in FIG. 2 are tracked asset 232 and logical asset boundary 230. Tracked asset 232 includes asset tag 233 associated therewith. Asset tag 233 includes a transmitter compatible with the network access points shown in FIG. 2. In some embodiments, asset tag 233 includes a transmitter that transmits pulses that are received by three or more of NAPs 202-209. The time-of-arrival and optionally angle-of-arrival of the pulses is determined by the network access points, and the network server (not shown) may determine the location of tracked asset 232.

Logical boundary 230 is a boundary against which the location of tracked asset 232 is compared. For example, logical boundary 230 may correspond to a laboratory, the outline of a retail store, or an intensive care unit in a hospital within which certain tracked assets are kept. When a particular tracked asset is detected outside logical boundary 230, network 200 may take appropriate action, such as raising an alert readable by security personnel.

Logical boundary 230 may correspond to a physical boundary, such as a building, a room within a building, or a courtyard on a campus, but this is not necessary. FIG. 2 shows one logical asset boundary 230. In some embodiments, many logical asset boundaries exist. For example, in a hospital, many different types of tracked assets may have asset tags, and each of these different types of assets may have a different logical asset boundary.

Figure 3:
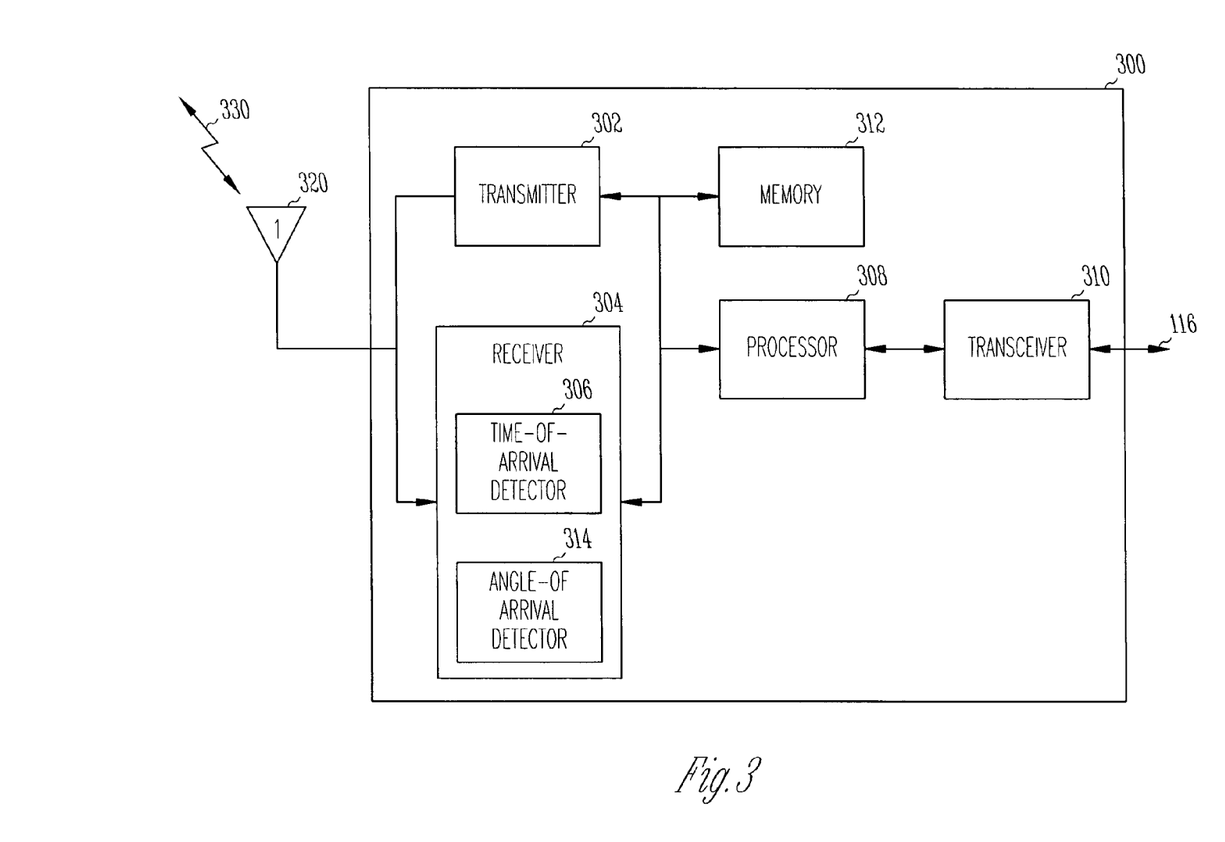
FIG. 3 shows a diagram of a network access point device.

FIG. 3 shows a diagram of a network access point device suitable for use at the network access points shown in FIGS. 1 and 2. Network access point device 300 includes transmitter 302, receiver 304, time-of-arrival detector 306, angle-of-arrival detector 214, processor 308, memory 312, and transceiver 310. Transceiver 310 communicates with a server (not shown) using media 116. Transceiver 310 also communicates with processor 308. Transmitter 302 and receiver 304 both communicate with processor 308 and antenna 320.

Antenna 320 receives wireless signals from network nodes and asset tags on wireless link 330. In some embodiments, wireless signals on wireless link 330 include electromagnetic pulses as described above with reference to FIG. 1. In these embodiments, receiver 304 receives the pulses, and time-of-arrival detector 306 detects the arrival time of the pulse. Time-of-arrival information is one of many possible attributes of a wireless signal that may be measured by receiver 304. For example, in some embodiments, angle-of-arrival detector 314 detects the angle from which the pulse arrived as an attribute of the wireless signal. Some embodiments measure both time-of-arrival and angle-of-arrival. Processor 308 receives information describing the wireless signal from receiver 304 and provides it to a network server using transceiver 310.

Time-of-arrival detector 306 can be implemented in a number of different ways. In one embodiment, the function of the time-of-arrival detector is a separate module within the network access point device 300. In other embodiments, time-of-arrival detector 306 is integrated into receiver 304. In yet other embodiments, time-of-arrival detector 306 utilizes processing capabilities of processor 308 to perform its function.

Angle-of-arrival detector 314 can also be implemented in a number of different ways. In some embodiments, angle-of-arrival detector 314 is a circuit that receives signals from a phased-array antennal to measure the angle from which the signals are received. In these embodiments, antenna 320 represents a phased-array antenna. Many other mechanisms can be used to measure the angle-of-arrival of the wireless signal.

Processor 308 may be any type of processor suitable to perform actions to support the operation of network access point device 300. For example, processor 308 may be a microprocessor, a microcontroller, or the like. Also for example, processor 308 may be a hardware controller or a collection of hardware controllers that perform specific tasks. Memory 312 represents an article that includes a machine-accessible medium. For example, memory 312 may represent any one or more of the following: a hard disk, a floppy disk, random access memory (RAM), read only memory (ROM), flash memory, CDROM, or any other type of article that includes a medium readable by a machine. Memory 312 may store instructions for performing the execution of the various method embodiments of the present invention. Memory 312 may also include data describing the current state of network access point device 300 and the entire network.

When multiple network access point devices 300 measure attributes of a single electromagnetic pulse, a network server may utilize this information to resolve the location of the network node from which the pulse originated. In some embodiments, multiple electromagnetic pulses are received by receiver 304. The multiple electromagnetic pulses may represent any type of communication from a network node. For example, a group of pulses may represent a network authentication request from a network node. Also for example, a group of pulses may represent an identification number or serial number from an asset tag. Receiver 304 derives information from groups of pulses, as well as from attributes describing the pulses. Processor 308 receives from receiver 304 information describing both groups of pulses as well as attributes of individual pulses. For example, processor 308 may receive an authentication request from receiver 304, as well as receiving time-of-arrival and angle-of-arrival information of pulses contained within the authentication request.

Figure 4:
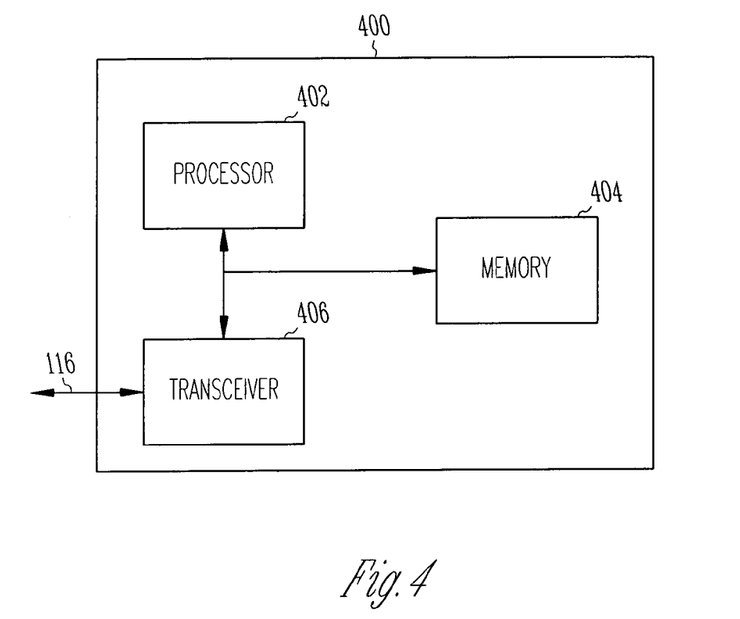
FIG. 4 shows a diagram of a network server.

FIG. 4 shows a diagram of a network server suitable for use in a wireless network such as network 100 (FIG. 1) or network 200 (FIG. 2). Server 400 includes processor 402, memory 404, and transceiver 406. Transceiver 406 is coupled to media 116 at port 410. As described above with reference to FIG. 1, media 116 couples the network server with any number of network access point devices such as network access point device 300 (FIG. 3). Transceiver 406 receives information from network access point devices on media 116. In some embodiments, wireless signal attributes are received from multiple network access point devices, and processor 402 determines the location of a transmitter from which the wireless signals originated. Server 400 may be a personal computer (PC), server, mainframe, handheld device, portable computer, or any other system that may perform the operations described herein.

Memory 404 represents an article that includes a machine-accessible medium. For example, memory 404 may represent any one or more of the following: a hard disk, a floppy disk, random access memory (RAM), read only memory (ROM), flash memory, CDROM, or any other type of article that includes a medium readable by a machine. Memory 404 may store instructions for performing the execution of the various method embodiments of the present invention. Memory 404 may also include data describing the current state of server 400 and the entire network. For example, memory 404 may include data describing logical boundaries, as well as the location of network nodes and asset tags. One possible set of data is shown in FIG. 5.

Figure 5:
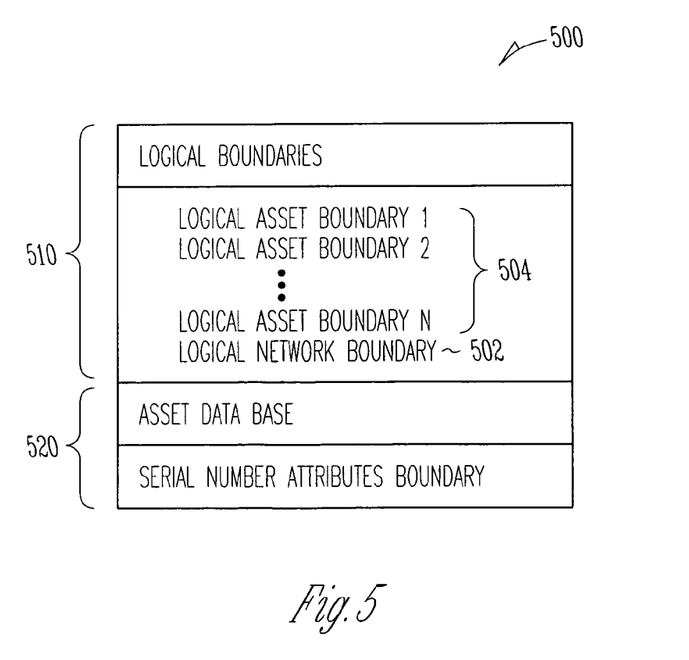
FIG. 5 shows data structures suitable for use in an embodiment of the present invention.

FIG. 5 shows data structures suitable for use in various embodiments of the present invention. Data structure 500 includes logical boundary database 510 and asset database 520. Logical boundary database 510 includes data 502 describing one or more logical network boundaries, and data 504 describing one or more logical asset boundaries. Data 502 describe a logical network boundary such as logical network boundary 220 (FIG. 2). The logical network boundary may be described by data 502 in any of many formats. For example, a series of line segments may be specified by end points, or vectors may be described by end points and direction. Similarly, data 504 may describe logical asset boundaries in any suitable format. For example, data 504 may include end points, vectors, or any shape.

Asset database 520 includes records describing asset tags and tracked assets. For example, an asset tag serial number may be maintained along with attributes of the tracked asset and the logical asset boundary to which the asset is assigned. The attributes may include any information that is useful. For example, in embodiments that track assets in a retail store environment, the attributes may include price and description data. Also for example, in embodiments that track assets in a laboratory, the attributes may include a description of the tracked asset and the identification of a person to be notified in the event that the asset leaves the logical asset boundary.

In operation, a network server may track a location of an asset having a serial number, and compare the location of the asset with the logical asset boundary specified in the asset database. For example, an asset tag may transmit a unique serial number that is received by at least one network access point device and sent to the server. The server may retrieve one or more appropriate records from the asset database using the serial number of the tracked asset. The location of the tracked asset may be compared against the logical asset boundary specified in the asset database. If the tracked asset is outside the boundary, an alert may be raised. As used herein, the term "raise an alert" refers to any appropriate action to be taken. For example, in some embodiments, raising an alert may include sending an email message to a responsible party. In other embodiments, raising an alert may include sounding a siren and turning on a flashing red light. The specific course of action to be taken when an alert is raised may be predefined or may also be dependent upon information stored in the attributes field of the appropriate asset database record.

As shown in FIG. 5, data structure 500 includes data in support of logical asset boundaries and logical network boundaries. Some embodiments include only logical asset boundaries, and other embodiments include only logical network boundaries. For example, in some embodiments the network is installed in an environment without tracked assets. In these embodiments, logical asset boundaries do not necessarily exist. In other embodiments, the network is installed in an environment that does not include network nodes, but does include tracked assets. In these embodiments, logical network boundaries do not necessarily exist.

Figure 6:
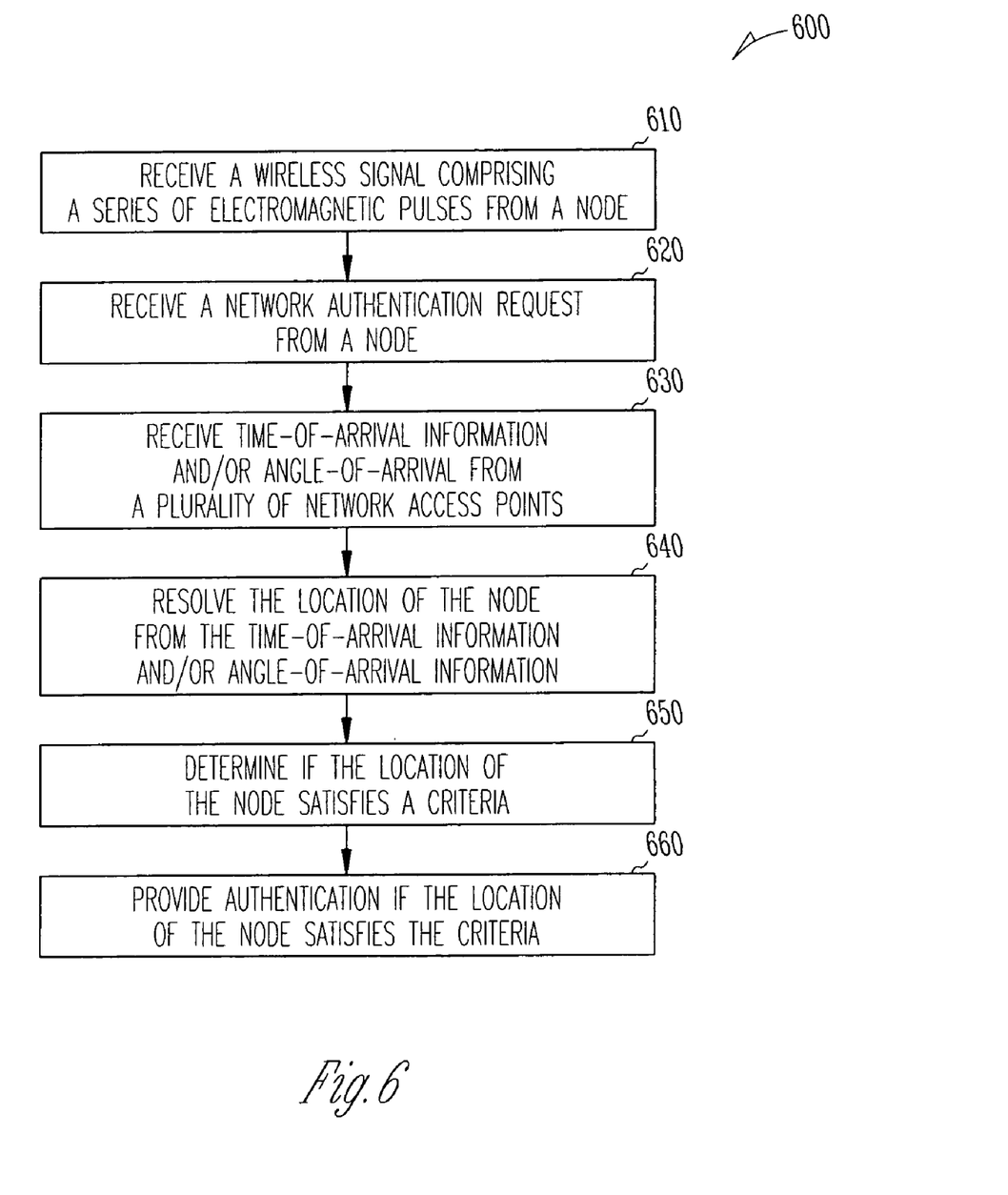
FIGS. 6 and 7 show flowcharts in accordance with various embodiments of the present invention.
Figure 7:
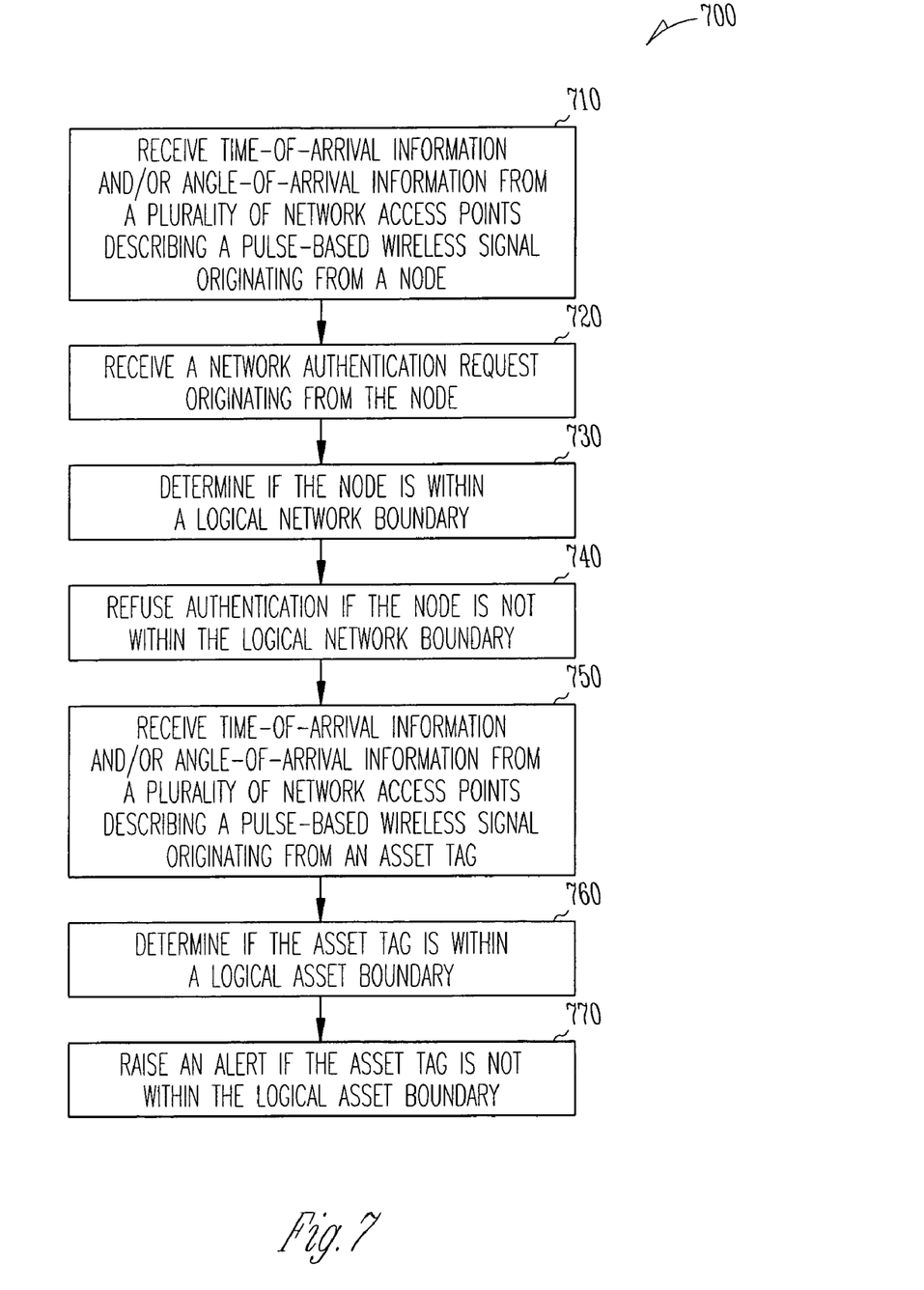

FIGS. 6 and 7 show flowcharts in accordance with various embodiments of the present invention. In some embodiments, methods 600 and 700 are performed by a server such as server 400 (FIG. 4). In other embodiments, the methods are distributed across a server and network access point devices. The various actions in methods 600 and 700 may be performed in the order presented, or may be performed in a different order. Further, in some embodiments, some actions listed in FIGS. 6 and 7 are omitted from methods 600 and 700, respectively.

Referring now to FIG. 6, a flowchart of a method for location-based network authentication is shown. At 610, a wireless signal comprising a series of electromagnetic pulses is received from a node. The node corresponds to a network node, such as those shown in the previous figures, that is attempting to access the network. The network node may be attempting to authenticate to the network using a single network access point, but the wireless signal may be received by multiple network access points devices. At 620, a network authentication request is received from the node. In some embodiments, the network authentication request is received by a single network access point device and forwarded to a network server. In other embodiments, the network authentication request is received by multiple network access point devices, all of which forward the request to the network server.

The remaining description of FIGS. 6 and 7 refers to the use of time-of-arrival information. Each reference to "time-of-arrival" is equally applicable to "angle-of-arrival" information. For example, when time-of-arrival information is transmitted, angle-of-arrival information may also be transmitted. Likewise, when time-of-arrival information is used to resolve the location of a node, angle-of-arrival information may also be used to resolve the location of a node.

At 630, time-of-arrival information is received from a plurality of network access points. The time-of-arrival information received may describe multiple electromagnetic pulses from the network node, or may describe a single electromagnetic pulse. At 640, the location of the node is resolved from the time-of-arrival information. At 650, a determination is made whether the location of the node satisfies a criteria. This may correspond to any location-based criteria. For example, the criteria may include one or more logical network boundaries. At 660, authentication is provided if the location of the node satisfies the criteria.

FIG. 7 shows a flowchart of a method for operating a network that includes location-based authentication and tracked assets. At 710, time-of-arrival information is received from a plurality of network access points. The time-of-arrival information describes a pulse-based wireless signal originating from the node. At 720, a network authentication request originating from the node is received. At 730, a determination is made whether the node is within a logical network boundary, and at 740, authentication is refused if the node is not within the logical network boundary.

At 750, time-of-arrival information is received from a plurality of network access points. This time-of-arrival information describes a pulse-based wireless signal originating from an asset tag. At 760, a determination is made whether the asset tag is within a logical asset boundary. This may include accessing a database such as database 500 (FIG. 5). At 770, an alert is raised if the asset tag is not within the logical asset boundary.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving wireless signals at a plurality of network access point devices including time-of-arrival information and a network authentication request from an asset tag associated with a tracked asset;
   determining a location of the tracked asset from attributes of the wireless signals transmitted between the asset tag and the network access point devices;
   determining if the location of the tracked asset is within a logical boundary;
   providing authentication if the location of the tracked asset is within the logical boundary;
   comparing the location of the tracked asset to the logical boundary; and
   raising an alert when the tracked asset is outside the logical boundary.

2. The method of claim 1 wherein receiving wireless signals includes receiving a series of electromagnetic pulses.

3. The method of claim 1 wherein determining a location of the tracked asset comprises:
receiving time-of-arrival information from a plurality of network access point devices; and
resolving the location of the tracked asset from the time-of-arrival information.

4. The method of claim 1 wherein determining a location of the tracked asset comprises:
receiving angle-of-arrival information from a plurality of network access point devices; and
resolving the location of the tracked asset from the angle-of-arrival information.

5. The method of claim 1 wherein determining a location of the tracked asset includes using time-of-arrival information from a plurality of network access point devices.

6. The method of claim 1 wherein determining a location of the tracked asset includes using angle-of-arrival information from a plurality of network access point devices.

7. A method comprising:
receiving time-of-arrival information from a plurality of network access point devices describing a pulse-based wireless signal originating from an asset tag associated with a tracked asset;
receiving a network location-based authentication request originating from the asset tag;
determining if the tracked asset is within a logical network boundary from the time-of-arrival information;
refusing location-based authentication if the node is not within the logical network boundary; and
raising an alert when the tracked asset is outside the logical network boundary.

8. The method of claim 7 further comprising receiving angle-of-arrival information from the plurality of network access point devices.

9. The method of claim 7 further comprising receiving angle-of-arrival information describing the pulse-based wireless signal originating from the asset tag.

10. An apparatus comprising a network configured to:
receive an electromagnetic pulse from a plurality of network access point devices transmitted from an asset tag associated with a tracked asset;
determine a location of the tracked asset from attributes describing the electromagnetic pulse including a time-of-arrival of the electromagnetic pulse;
determine if the location of the tracked asset is within a logical boundary;
provide authentication if the location of the tracked asset is within the logical boundary;
compare the location of the tracked asset to the logical boundary; and
raise an alert when the tracked asset is outside the logical boundary.

11. The article of claim 10 wherein the network includes a database that includes information relating to the tracked asset.

12. A network comprising:
a plurality of network access point devices, each of the plurality of network access point devices including a receiver to receive wireless signals including a network authentication request from an asset tag associated with a tracked asset, and including a transmitter to transmit attributes of the wireless signals including a time-of-arrival of the wireless signals; and
a server coupled to the plurality of network access point devices to receive the attributes of the wireless signals and the network authentication request, to determine a location of the tracked asset from the attributes including the time-of-arrival, to compare the location of the tracked asset to a logical boundary, to provide authentication if the location of the tracked asset is within the logical boundary, and to raise an alert when the tracked asset is outside the logical boundary.

13. The network of claim 12 wherein each of the plurality of network access point devices is configured to receive pulsed wireless signals from the asset tag.

14. The network of claim 13 wherein each of the plurality of network access point devices further include time-of-arrival detection circuitry to detect time-of-arrival of pulses as one of the attributes of the wireless signals.

15. The network of claim 14 wherein each of the plurality of network access point devices further includes angle-of-arrival detection circuitry to detect angle-of-arrival of pulses as another of the attributes of the wireless signals.

16. The network of claim 12 wherein each of the plurality of network access point devices is configured to receive a series of electromagnetic pulses, and to measure a time-of-arrival of the electromagnetic pulses as one of the attributes of the wireless signals.

17. The network of claim 16 wherein each of the plurality of network access point devices is further configured to measure an angle-of-arrival of the electromagnetic pulses as another of the attributes of the wireless signals.

18. The network of claim 16 wherein the server is configured to receive the time-of-arrival from each of the plurality of network access point devices and resolve the location of the tracked asset.

19. The network server of claim 11 wherein the network server is further configured to receive time-of-arrival information from the wireless network access point devices.

20. A network server comprising at least one port to couple the network server to a plurality of wireless network access point devices, the network server being configured to receive wireless signal attributes including a time-of-arrival of wireless signals and a network authentication request from the plurality of wireless network access point devices, to determine a location of an asset tag associated with a tracked asset from the wireless signal attributes including the time-of-arrival, and to conditionally perform an action based on the location of the tracked asset; and
wherein the network server is configured to:
determine if the location of the tracked asset is within a logical boundary;
compare the location of the tracked asset to the logical boundary;
provide authentication if the location of the tracked asset is within the logical boundary; and
raise an alert when the tracked asset is outside the logical boundary.

21. The network server of claim 20 wherein the network server is further configured to receive angle-of-arrival information from the wireless network access point devices.

* * * * *

UNITED STATES PATENT AND TRADEMARK OFFICE
CERTIFICATE OF CORRECTION

| | | |
|---|---|---|
| PATENT NO. | : 7,346,358 B2 | Page 1 of 1 |
| APPLICATION NO. | : 10/179941 | |
| DATED | : March 18, 2008 | |
| INVENTOR(S) | : Wood et al. | |

It is certified that error appears in the above-identified patent and that said Letters Patent is hereby corrected as shown below:

In column 10, line 37, in Claim 19, delete "claim 11" and insert -- claim 20 --, therefor.

Signed and Sealed this

Ninth Day of November, 2010

David J. Kappos
*Director of the United States Patent and Trademark Office*